United States Patent

[11] 3,622,864

| | | |
|---|---|---|
| [72] | Inventors | William A. Claps; David R. Figueroa, both of Hialeah, Fla. |
| [21] | Appl. No. | 840,207 |
| [22] | Filed | July 9, 1969 |
| [45] | Patented | Nov. 23, 1971 |
| [73] | Assignee | Coulter Electronics, Inc. Hialeah, Fla. |

[54] METHOD AND CIRCUITRY FOR GENERATING AND HOLDING PROPORTIONAL AGAINST INPUT POWER VARIATIONS A CURRENT AND A RESULTING VOLTAGE FOR PARTICLE ANALYZER
16 Claims, 4 Drawing Figs.

[52] U.S. Cl. .................................................. 323/4, 307/35, 307/297, 323/20, 323/22 T, 324/71 CP
[51] Int. Cl. .................................................. G01n 27/00, G06f 7/38, G05f 1/10
[50] Field of Search .................................................. 323/4, 9, 16–22 T, 22 SC, 40; 324/71 PC; 307/15, 35, 297

[56] References Cited
UNITED STATES PATENTS

| 3,295,059 | 12/1966 | Coulter et al. ............ | 324/71 PC |
| 3,444,463 | 5/1969 | Coulter et al. ............ | 324/71 PC |
| 3,480,852 | 11/1969 | Han-Min Hung ............ | 323/20 X |

*Primary Examiner*—Gerald Goldberg
*Attorney*—Silverman and Cass

ABSTRACT: To improve the precision operation of a "Coulter Counter" particle analyzer, which is subject to small magnitude, yet statistically important input power voltage changes that are random in nature and magnitude, the current applied to the microscopic sensing aperture and the voltage applied to the threshold circuits, which monitor and respond to the amplitudes of the particle signals derived from the sensing aperture, are caused to track one another; so that variations of input power do not adversely affect the precision output of the particle analyzer. In series with both the sensing aperture circuit and the threshold circuits is the power supply, a polarity control switch and a current sensing resistor. Interposed between the current sensing resistor and the threshold circuits is an absolute value amplifier, which applies to the threshold circuits a voltage proportional to the aperture current. Additionally, the output from the absolute value amplifier is compared with an arbitrary voltage reference, and the result of the comparison is employed to determine both the aperture current and the threshold voltage.

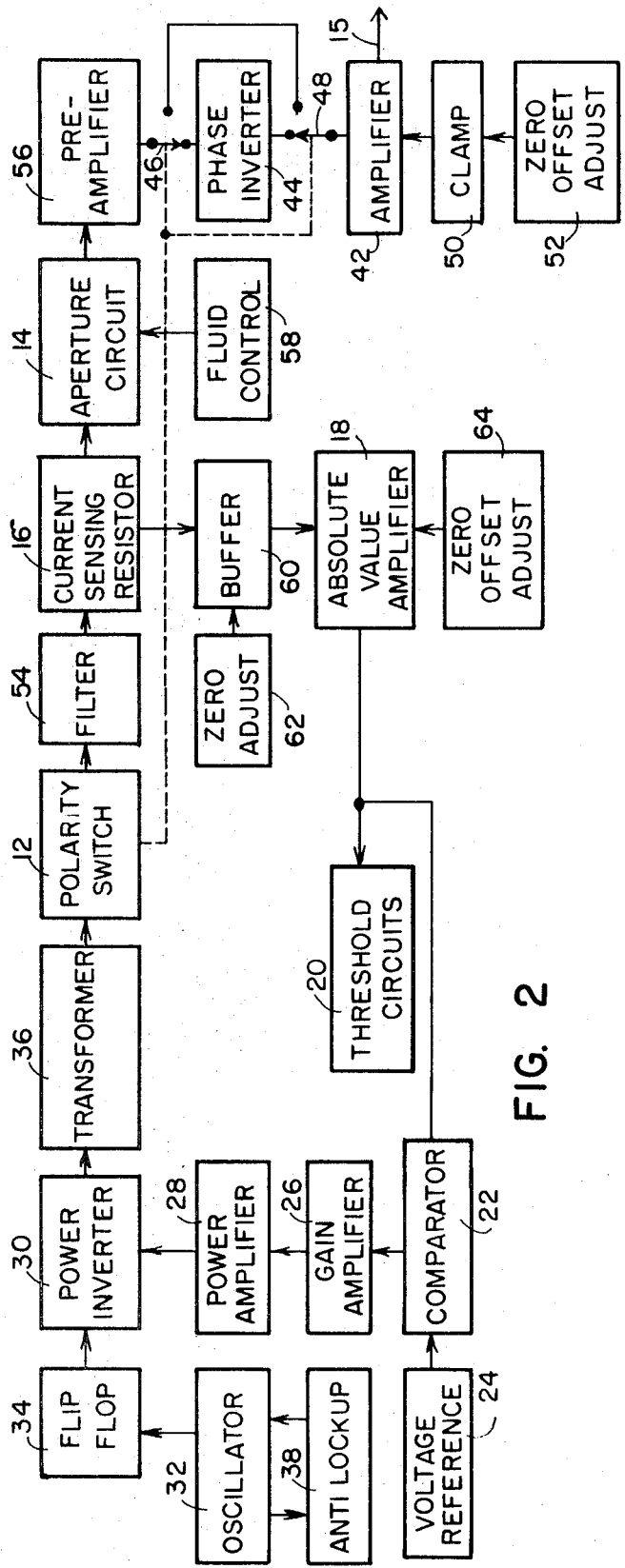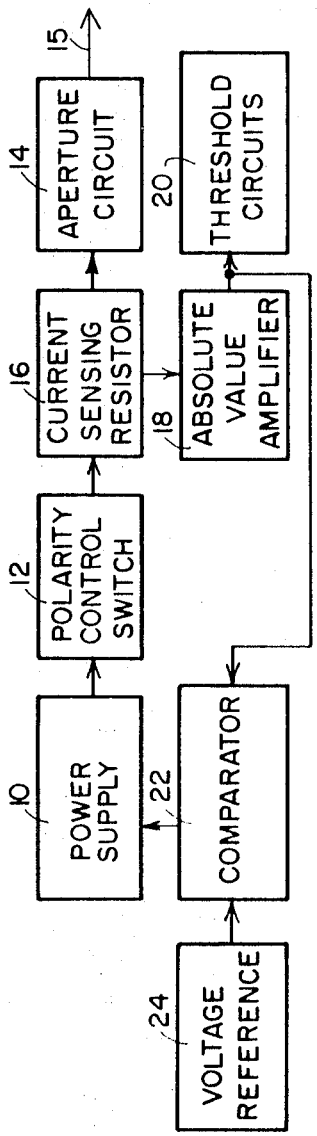

Inventors
WILLIAM A. CLAPS
DAVID R. FIGUEROA
BY Silverman & Cass
ATTYS.

3,622,864

METHOD AND CIRCUITRY FOR GENERATING AND HOLDING PROPORTIONAL AGAINST INPUT POWER VARIATIONS A CURRENT AND A RESULTING VOLTAGE FOR PARTICLE ANALYZER

BACKGROUND OF THE INVENTION

For more than twenty years, since the conception of the Coulter principle of particle counting and analysis, such principle, its modifications and improvements being sold throughout the world under the trademark "Coulter Counter" and described in numerous patents, such as 2,656,508 and 3,259,842, fluctuations in power line voltage have contributed a random factor that has to some extent reduced the relative precision of the analysis apparatus. As the overall quality, speed and capabilities of the analyzers have increased, the demand for higher precision has also increased to the point that even the relatively small loss of precision due to power line changes has become significant.

As now well known from the teachings of the Coulter principle, when particles suspended in an electrolyte are moved relative to the scanning ambit of an electronic sensor, the difference in the impedance of the particle, as compared to the impedance of the equal volume of electrolyte suspension it displaces, causes a detectable signal proportional to the volume or size of the particle.

As commonly practiced, the sensor comprises a minute passageway defined by a microscopic aperture through which both particles and electrolyte are moved at rates of up to several thousand particles per second. Near each end of the passageway or aperture path are located electrodes which enable the sensing of the impedance changes in the path due to the presence of a particle.

Useful data, primarily based upon the relative amplitude of each particle-produced signal, is collected and distributed according to particle size. Such size distributions are generally detected by a plurality of threshold level circuits, which define different particle size ranges.

The relationship between the current supplied to the aperture circuit and the voltage applied to the threshold circuits must remain proportional, otherwise the analyzer will operate imprecisely. For example, if a particle of unity volume is to produce a pulse of unity amplitude, it will just cross the unity threshold level. However, if for some reason the aperture current were doubled and the threshold voltage unchanged, the unity particle would produce a pulse having an amplitude of twice unity and be detected by the associated threshold circuit so as to appear to have twice its actual volume. If, both aperture current and threshold level were doubled, the resulting double amplitude pulse would rise only to the unity threshold level, which is sitting at double its initial voltage. Hence, the analyzer would operate with precision by reporting a unity sized particle.

Although the above stated problem and its theoretical solution now may seem simple. Experience has taught that the degree of desired precision is difficult to achieve, even without consideration of system cost.

One approach and reasonable solution to the problem is taught in the aforementioned U.S. Pat. No. 3,259,842 and has been commercially successful for several years. In such approach, both the aperture current supply and the potentiometers of the threshold circuits are energized from the same power supply transformer, with the windings for the reference voltage of the aperture current regulator and the windings supplying the voltage for the thresholds being tightly coupled. Accordingly, input voltage variations affect both aperture current and thresholds similarly.

The increased use of multichannel analyzers, which employ numerous thresholds that define particle size ranges quite close to one another; the fact that the randomly varying power changes are of both polarities with respect to a chosen level; and the aforementioned desire for medical and industrial particle analyzers of extreme precision have lead to a need for the subject reference generation method and circuitry.

SUMMARY OF THE INVENTION

In series with both the aperture circuit and the threshold circuits is the series arrangement of a power supply, a polarity control switch and a current sensing resistor. Interposed only between the current sensing resistor and the threshold circuits is an absolute value amplifier, which operates so as to maintain a proportionality between the current applied to the aperture circuit and the voltage applied to the threshold circuits, notwithstanding fluctuations in the power supply, both plus and minus relative a nominal level.

Additionally, so as to enable the selection of an arbitrary operative level, this reference generation method and circuitry provide an arbitrary voltage reference, which is compared to the output from the absolute value amplifier, and the resultant is fed back to the power supply. BRIEF DESCRIPTION OF THE DRAWINGS FIG. 1 is a simplified block diagram of the major elements of the subject circuitry;

FIG. 2 is a detailed block diagram of the invention shown in FIG. 1, including supporting components; and FIG. 3 is a schematic of the block diagram of FIG. 2, divided into two sheets, FIGS. 3A and 3B.

DESCRIPTION OF A PREFERRED EMBODIMENT

FIG. 1 is presented and next will be described briefly as an introduction to and ready reference for the more complex diagram in FIG. 2. Likewise, the subsequent description of FIG. 2 circuitry component blocks will enable those skilled in the art to inspect the FIG. 3 schematic, on which only the component block reference numbers and voltages are inscribed, and adequately be informed of a preferred mode of practicing the invention.

Figure 3A:
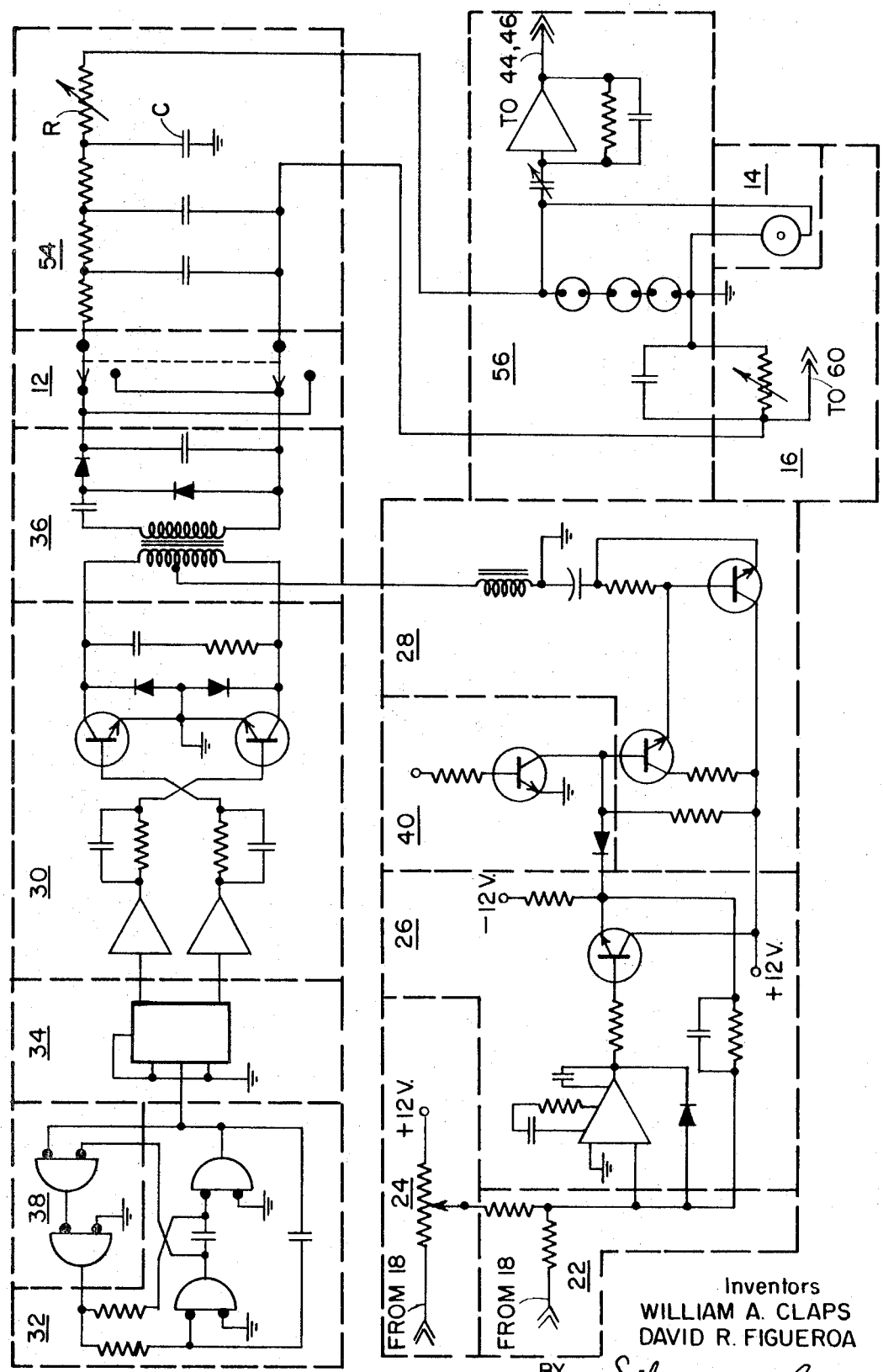

In FIG. 1, a power supply 10, which generally can be any appropriate DC source, but unfortunately is subject to random variations, is connected to a polarity control switch 12. After each analysis run, the switch 12 reverses the polarity of its output, so as to minimize the polarization tendency of the detecting electrodes associated with the scanning aperture all of which are a part of the aperture circuit 14. The analyzer output 15 is taken from the output of the aperture circuit. Interposed in series between the aperture circuit 14 and the polarity control switch 12 is a current sensing resistor 16. The arrangement just described is unique with respect to any prior "Coulter Counter" and permits the current sensing resistor 16 to be grounded, as shown in FIG. 3A, an orientation that has proven to be of considerable convenience.

Also coupled to the current sensing resistor 16 is an absolute value amplified 18, the output of which is coupled to the potentiometer inputs of the threshold circuits 20. Thus, no matter the polarity of the switch 12, and notwithstanding the fact that the current sensing resistor 16 is grounded, the polarity of the input to the threshold circuits 20 is always the same, is proportional to the aperture current, and retains such proportionality even when faced with random fluctuations in the power supply; hence, the primary feature of the invention is accomplished.

A comparator 22 has one input coupled to the output of the absolute value amplifier 18, its other input is coupled to the output of a voltage reference 24, and its output is fed back to the power supply 10. Coupled in this manner, the two inputs to the comparator are compared, the magnitude of their difference is derived and amplified as an error signal, and such error signal is fed to the power supply 10 as a control signal in a negative feedback mode. The result of this control coupling is that the value of the reference voltage determines the operating level of the aperture and threshold circuits; a second feature of the invention.

If the voltage reference 24 is more stable than the power supply 10, making the gain of the comparator relatively high will cause an increasing stability to the entire reference generation circuitry; a third feature of the invention. It should be emphasized that these latter two features are not essential to the achievement of the primary feature of having the aperture and threshold circuits operate proportionately, i.e., the threshold voltage to track the aperture current when the power supply generates power line voltage changes.

With reference to FIG. 2, a gain amplifier 26 is coupled to the output of the comparator 22 to effect the increased stability just above discussed. A DC power amplified 28 acts as the primary element in the power supply 10, and is coupled between the gain amplifier 26 and a power inverter 30. Also part of the power supply is an oscillator 32 which, in the preferred embodiment, operates at about 40 kHz. and provides somewhat square waves to a flip-flop 34 to trigger that device once each complete cycle. The output from the flip-flop is a perfectly symmetric square wave of half the oscillator frequency and is the desired basic supply for the aperture circuit 14 and the threshold circuits 20. The primary of a transformer 36 receives the output from the flip-flop by way of the power inverter 30 and provides as its output an AC excitation, which is rectified and filtered to become the output from the power supply 10.

An antilockup circuit 38 is intercoupled with the oscillator 32 and "looks at" the state of the transistors in the gate elements, which if locked into the same state would terminate oscillation, and gives appropriate ones of these transistors a change of state "shove" in the event of an inadvertent lockup. Not shown in FIGS. 1 or 2, but shown in FIG. 3A is an amplifier on-off control 40, which is coupled between the gain amplifier 26 and the power amplifier 28. The elements 28 through 40, as above described, comprise the power supply 10, the output of which is taken from the secondary of the transformer 36.

As discussed with reference to FIG. 1, the polarity switch 12 receives the output of the power supply and reverses its polarity at the end of each sample run. So as to maintain a constant polarity for particle-produced signals at the output 15 of an output amplifier 42, this being the system output shown in FIG. 1, there is provided a phase inverter 44 in advance of the output amplifier. Ganged switches 46 and 48 are coupled to the input and output of the phase inverter and are linked to the polarity switch 12 so as to place the phase inverter in or out of the circuit, depending upon polarity selected by the polarity switch. A clamp 50 and a zero offset adjustment 52 are coupled to the output amplifier 42 in a typical manner.

A filter 54, comprising cascaded RC sections, is coupled to the current sensing resistor 16 and the aperture circuit 14 in the manner shown in FIG. 3A to remove 20 kHz. ripple. The final filter capacitor C cannot be placed directly across the aperture 14 without short circuiting the particle produced signal; hence, a resistor R is provided as shown in FIG. 3A. Preferably, the current sensing resistor 16 is quite small with respect to the resistor R to minimize pickup of unwanted noise, etc., at the aperture.

A low input impedance preamplifier 56 couples the aperture circuit to the amplifier 42. Fluid control means 58 (not shown in FIG. 3) regulates the flow of the suspension of particles through the aperture 16. Manometer structures have been commonly employed in "Coulter Counters," such as that described in U.S. Pat. No. 2,869,078.

Figure 3B:
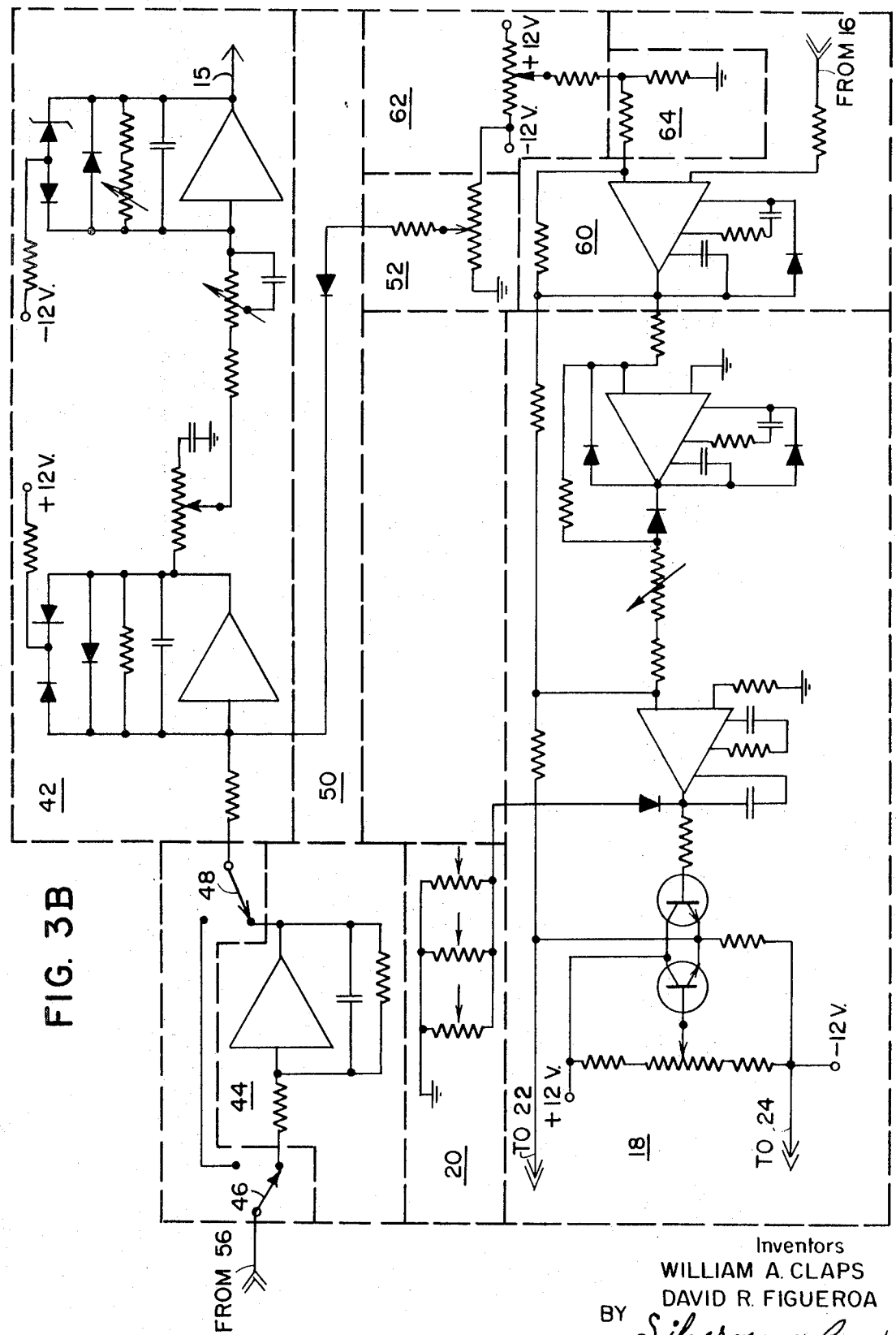

Completing the circuitry blocks in FIG. 2 and as shown in FIG. 3B are an amplifier buffer 60, interposed between the current sensing resistor 16 and the absolute value amplifier 18; a zero adjust 62 for the buffer 60; and a zero offset adjust 64 for the absolute value amplifier.

With respect to the relationship of FIG. 2 to FIGS. 3A and 3B, FIG. 3A contains the entire left and top portions of FIG. 2, which includes the power, comparator and aperture input elements; and FIG. 3B contains the lower and right portions of FIG. 2, which includes the output, absolute value and threshold elements.

It is believed that FIG. 3 is self-defining and descriptive to those skilled in the art; hence, the foregoing block descriptions and related system operation provide adequate basis for the practice of the invention, both its method and circuitry, for those skilled in the art.

It is to be understood that the schematic of FIG. 3 is by no means the only way that the FIGS. 1 and 2 elements could be designed in an operative embodiment, but merely a practical example of circuitry for accomplishing the goals of the invention.

What is to be secured by United States Letters Patent is:
We claim:

1. A method for generating from a common power supply, which is subject to random power line changes, a current for a particle analyzing aperture circuit and a resulting voltage for threshold circuits of a particle analyzer, such that said current and said voltage remain proportional to one another to a high degree of precision despite said power line changes, comprising the steps of:
   sensing the current which is being supplied to the aperture circuit by the power supply, switching periodically the polarity of the output from the power supply prior to said sensing, employing the sensed current to define a sensed voltage, deriving the absolute value of said sensed voltage, and applying said absolute value of voltage to the threshold
   circuits.

2. A method according to claim 1 further comprising
   comparing said absolute value of voltage with an arbitrary voltage reference, and
   feeding the result of said comparing back to the power supply such that the nominal levels of said current and said voltage are determined by the arbitrary voltage reference.

3. A method according to claim 2 further comprising
   amplifying the gain of the result of said comparing for increasing the stability of said current and said voltage.

4. A method according to claim 1 further comprising
   inverting the phase of the output of the aperture circuit synchronously with said switching.

5. A method according to claim 4 in which
   said sensing is accomplished by a resistive impedance.

6. A method according to claim 5 further comprising
   filtering the output of the power supply prior to said sensing, coupling by resistive impedance the resultant of said filtering to the aperture circuit, and
   regulating the resistive sensing impedance to be significantly small with respect to the resistive coupling impedance.

7. Circuitry for the generation from a common power supply, which is subject to random power changes, a current and a resulting voltage for application to respectively different circuitry elements, such that said current and said voltage are held closely proportional to one another despite said random power changes, comprising:
   means for sensing said current as it is being applied from said power supply to a first of said circuitry elements, a polarity reversing switch interposed between said power supply and said current sensing means, for periodic operation to reduce the polarization tendency of at least said first circuitry element, and
   means for measuring said sensed current and deriving therefrom a proportional voltage of absolute value for application to a second of said circuitry elements.

8. Circuitry according to claim 7 wherein said sensing means and said measuring means in combination comprise
   a resistor having one end connected to said first circuitry element and its other end coupled to said power supply and an absolute value amplifier.

9. Circuitry according to claim 8 wherein
   an aperture circuit for a particle analyzer comprises said first circuitry element,
   at least one threshold circuit comprises said second circuitry element, and
   said one end of said resistor is grounded.

10. Circuitry according to claim 9 further comprising
    filter means coupled between said power supply, said aperture circuit, and said resistor, a coupling resistor connecting the output of said filter to said aperture circuit, and the impedance of said sensing and measuring resistor being significantly smaller than the impedance of said coupling resistor.

11. Circuitry according to claim 7 further comprising a phase inverter coupled to the output of said first circuitry element, and ganged switching means selectively connectable to said phase inverter in response to operation of said polarity reversing switch, whereby said phase inverter is placed operatively into said generation circuitry when said polarity switch enables the passage of power of one selected polarity.

12. Circuitry according to claim 7 wherein said power supply comprises an oscillator, a bistable device for shaping the output of said oscillator into square waves, a power amplifier logically parallel to said bistable device, and a transformer having its primary coupled to be responsive to both said bistable device and said power amplifier, and its secondary coupled to the input of said polarity reversing switch.

13. Circuitry according to claim 7 further comprising a comparator having one input for receiving said voltage of absolute value and an output coupled to said power supply in a feedback mode, and a voltage reference having an output coupled to another input to said comparator, whereby the two inputs define an error signal that is applied to regulate said power supply.

14. Circuitry according to claim 13 further comprising a gain amplifier interposed between the output of said comparator and said power supply for increasing the stability of said generation circuitry.

15. Circuitry according to claim 14 further comprising a phase inverter coupled to the output of said first circuitry element, and ganged switching means selectively connectable to said phase inverter in response to operation of said polarity reversing switch, whereby said phase inverter is placed operatively into said generation circuitry when said polarity switch enables the passage of power of one selected polarity.

16. Circuitry according to claim 15 wherein an aperture circuit for a particle analyzer comprises said first circuitry element, and at least one threshold circuit comprises said second circuitry element.

\* \* \* \* \*